United States Patent
Schuette et al.

(10) Patent No.: US 11,746,245 B2
(45) Date of Patent: Sep. 5, 2023

(54) SOLUBLE CORROSION RESISTANT SOL-GEL

(71) Applicants: THE BOEING COMPANY, Chicago, IL (US); Commonwealth Scientific and Industrial Research Organisation, Canberra (AU)

(72) Inventors: Waynie M. Schuette, Troy, IL (US); Patrick J. Kinlen, Fenton, MO (US); Paul Andrew White, Melbourne (AU)

(73) Assignee: THE BOEING COMPANY, Arlington, VA (US)

( * ) Notice: Subject to any disclaimer, the term of this patent is extended or adjusted under 35 U.S.C. 154(b) by 149 days.

(21) Appl. No.: 16/252,387

(22) Filed: Jan. 18, 2019

(65) Prior Publication Data

US 2019/0241752 A1 Aug. 8, 2019

Related U.S. Application Data

(60) Provisional application No. 62/625,785, filed on Feb. 2, 2018.

(51) Int. Cl.
*C09D 183/14* (2006.01)
*C09D 5/08* (2006.01)
(Continued)

(52) U.S. Cl.
CPC ............ *C09D 5/086* (2013.01); *C08G 77/16* (2013.01); *C08G 77/18* (2013.01); *C08G 77/58* (2013.01);
(Continued)

(58) Field of Classification Search
CPC .... C08G 2150/90; C08G 77/16; C08G 77/18; C08G 77/58; C08K 5/0091; C08K 5/057;
(Continued)

(56) References Cited

U.S. PATENT DOCUMENTS 6,200,672 B1  3/2001  Tadokoro et al.
9,290,846 B2  3/2016  Rey et al.
(Continued)

FOREIGN PATENT DOCUMENTS

CN   102459473 A   5/2012
CN   105624659 A   6/2016
(Continued)

OTHER PUBLICATIONS

Chemistry and Applications of Inorganic-Organic Polymers (Organically Modified Silicates), published 1986.*
(Continued)

*Primary Examiner* — Michael B Nelson
(74) *Attorney, Agent, or Firm* — Patterson + Sheridan, LLP

(57) ABSTRACT

Aspects described herein generally relate to a sol-gel that is the reaction product of an organosilane, a metal alkoxide, an acid, and a thio-lanthanide salt having a solubility of about 1 gram or greater per gram of sol-gel at 23° C. The thio-lanthanide salt includes a cation and a thio-ligand. The cation can be lanthanum, cerium, praseodymium, neodymium, promethium, samarium, europium, gadolinium, terbium, dysprosium, holmium, erbium, thulium, ytterbium, lutetium, scandium, yttrium, cobalt, calcium, strontium, barium, and zirconium. In another aspect, a component, such as a vehicle component, includes a metal substrate and a sol-gel disposed on the metal substrate. Methods can include forming a sol-gel by mixing a metal alkoxide and an acid to form a first mixture; mixing with the first mixture an organosilane to form a second mixture; and mixing with the second mixture a lanthanide salt to form a third mixture.

19 Claims, 3 Drawing Sheets

(51) Int. Cl.
*C08G 77/58* (2006.01)
*C09D 7/60* (2018.01)
*C08G 77/16* (2006.01)
*C08G 77/18* (2006.01)
*C08K 5/057* (2006.01)
*C08K 5/09* (2006.01)
*C08K 5/378* (2006.01)
*C09D 5/02* (2006.01)
*C09D 183/06* (2006.01)
*C08K 5/00* (2006.01)

(52) U.S. Cl.
CPC ............... *C08K 5/057* (2013.01); *C08K 5/09* (2013.01); *C08K 5/378* (2013.01); *C09D 5/024* (2013.01); *C09D 5/082* (2013.01); *C09D 7/60* (2018.01); *C09D 183/06* (2013.01); *C09D 183/14* (2013.01); *C08G 2150/90* (2013.01); *C08K 5/0091* (2013.01)

(58) Field of Classification Search
CPC ........ C08K 5/09; C08K 5/378; C09D 183/06; C09D 183/14; C09D 5/024; C09D 5/082; C09D 5/086; C09D 7/60
See application file for complete search history.

(56) References Cited

U.S. PATENT DOCUMENTS

| | | | | |
|---|---|---|---|---|
| 2008/0111027 | A1* | 5/2008 | Blohowiak | C23C 18/1254 244/133 |
| 2009/0192251 | A1 | 7/2009 | Chung et al. | |
| 2012/0085261 | A1 | 4/2012 | Barbe et al. | |
| 2016/0145443 | A1* | 5/2016 | Kinlen | C23C 18/1241 428/457 |
| 2018/0105702 | A1* | 4/2018 | Mardel | C09D 163/00 |

FOREIGN PATENT DOCUMENTS

| | | | |
|---|---|---|---|
| EP | 1002889 A2 | | 5/2000 |
| FR | 2946644 A1 | | 12/2010 |
| WO | WO 2016/154680 | * | 10/2016 |
| WO | 2018064721 A1 | | 4/2018 |

OTHER PUBLICATIONS

PCT Notificatication of Transmittal of the International Search Report and the Written Opinion of the International Searching Authority of Declaration for Application No. PCT/US2019/016396 dated May 16, 2019.

China National Intellectual Property Administration, First Notification of Office Action for Application 201980011460.5, dated Aug. 27, 2021.

China National Intellectual Property Administration, Search Report for Application 201980011460.5 dated Aug. 10, 2021.

China National Intellectual Property Administration, Second Notification of Office Action for Application 201980011460.5, dated Apr. 22, 2022.

* cited by examiner

SOLUBLE CORROSION RESISTANT SOL-GEL

CROSS-REFERENCE TO RELATED APPLICATIONS

This patent application claims the benefit of and priority to U.S. provisional patent application No. 62/625,785, filed Feb. 2, 2018, which is incorporated herein by reference in its entirety.

FIELD

Aspects of the present disclosure generally relate to corrosion resistant sol-gels and methods for forming sol-gels.

BACKGROUND

Aircraft surfaces are typically made of a metal, such as aluminum or titanium. A primer can be coated on the metal surface to prevent or reduce corrosion. Furthermore, an adhesive coating is typically disposed between a metal surface and a primer to promote adhesion between the metal and the primer.

An adhesive sol-gel film may be disposed at the interface between the metal and primer. After extended use of the aircraft surface, a sol-gel film may become increasingly porous. The pores retain water over time, which can promote corrosion of the metal surface. Typical sol-gel films do not inherently possess corrosion resistance properties. Furthermore, the presence of water within the pores is subject to an increase of osmotic pressure within the pores which creates a visually noticeable defect in the surface known as a "blister".

Corrosion protection of aircraft metal surfaces has typically relied on primers having hexavalent chromium. However, there is regulatory pressure to eliminate the use of hexavalent chromium from primers and pretreatments. Furthermore, corrosion inhibitors have been added to sol-gel films (or included in the formation of the sol-gel film). However, these inhibitors have been found to decrease both the adhesiveness of the sol-gel film and are poorly soluble in aqueous sol-gels, which reduces the anticorrosion ability of the corrosion inhibitor when present in the sol-gel.

Therefore, there is a need for new and improved corrosion resistant, adhesive sol-gel and methods for forming sol-gels.

SUMMARY

In one aspect, a sol-gel includes an organosilane, a metal alkoxide, an acid, a thio-lanthanide salt having a solubility of about 1 gram or greater per gram of sol-gel at 23° C., and water.

In another aspect, a component, such as a vehicle component, includes a metal substrate and a sol-gel disposed on the metal substrate. The sol-gel includes an organosilane, a metal alkoxide, an acid, a thio-lanthanide salt having a solubility of about 1 gram or greater per gram of sol-gel at 23° C., and water.

In another aspect, a method of forming a sol-gel includes mixing a metal alkoxide and an acid to form a first mixture; mixing with the first mixture an organosilane to form a second mixture; and mixing with the second mixture a thio-lanthanide salt to form a third mixture.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
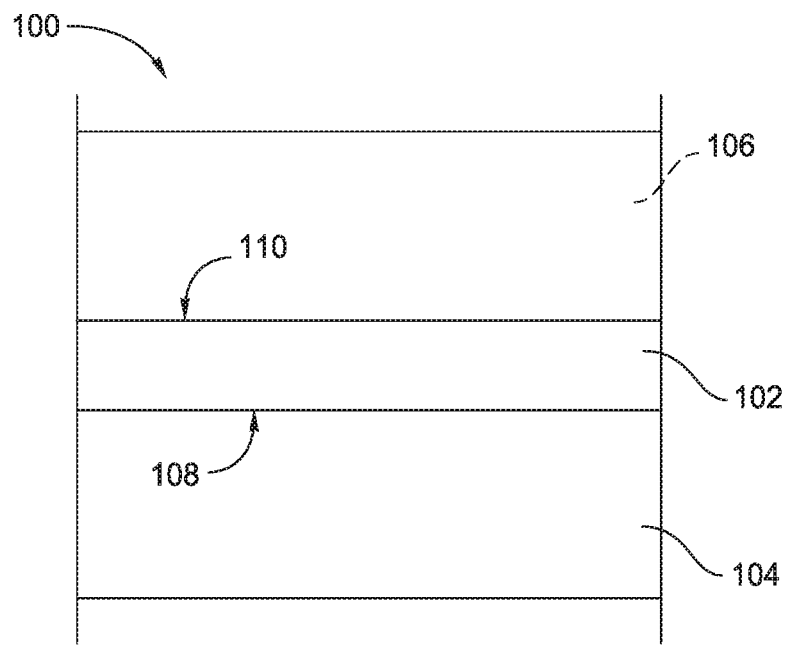
FIG. 1 is a side view of a corrosion-inhibiting sol-gel disposed on a substrate.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Aspects of the present disclosure generally relate to corrosion resistant sol-gels. Sol-gels of the present disclosure include (or are the reaction product of) an organosilane, a metal alkoxide, an acid, and a thio-lanthanide salt. It has been discovered that thio-lanthanide salts are corrosion inhibitors having a high solubility in aqueous sol-gels. It has been discovered that corrosion inhibitors of the present disclosure are, unlike conventional corrosion inhibitors, readily soluble in the aqueous sol-gel and, as such, can diffuse through the sol-gel to protect the metal substrate from corrosion. Diffusion through the sol-gel can allow soluble inhibitors to leach out of the coating to some extent and protect a substrate from corrosion, unlike insoluble inhibitors. The high solubility provides improved inhibitor efficiency because of the reduced solids content in the sol-gel and a more uniform coating with lower porosity, as compared to sol-gels having corrosion inhibitors of low solubility in the sol-gel. Soluble corrosion inhibitors of the present disclosure also provide lower concentrations of corrosion inhibitor in a sol-gel while maintaining or improving the corrosion resistance of the sol-gel, as compared to conventional corrosion inhibitors of low solubility in a sol-gel. Soluble corrosion inhibitors also provide sol-gel coatings with more uniformity and lower porosity as compared to sol-gel coatings having corrosion inhibitors of low solubility. Furthermore, sol-gels having soluble corrosion inhibitors maintain their adhesion properties when disposed on a metal substrate and/or when a primer layer is disposed on the sol-gel due to the reduced solids content of the sol-gel, as compared to a sol-gel without soluble corrosion inhibitor.

It has also been discovered that soluble corrosion inhibitors of the present disclosure do not hinder (1) sol-gel formation, (2) adhesive ability of the sol-gel film upon addition of the corrosion inhibitor, or (3) anticorrosion ability of the corrosion inhibitor. Sol-gels of the present disclosure have inherent corrosion inhibiting ability, and, primers (disposed on the sol-gel) having hexavalent (VI) chromium are merely optional.

Methods of forming a sol-gel of the present disclosure include mixing a metal alkoxide and an acid, such as acetic acid, followed by stirring for about 1 minute to about 1 hour, such as about 30 minutes. An organosilane is then added to the mixture and stirred from about 1 minute to about 1 hour, such as about 30 minutes. A corrosion inhibitor is added to the mixture. The mixture can be deposited onto a metal substrate. The deposited mixture may be cured at ambient temperature or can be heated to increase the rate of curing/sol-gel formation.

Sol-Gels

The term "sol-gel," a contraction of solution-gelation, refers to a series of reactions wherein soluble metal species (typically a metal alkoxide or metal salt) hydrolyze to form a metal hydroxide. A soluble metal species forms hetero-metal bonds e.g. Si—O—Zr. An acid is added to the metal alkoxide to provide a water-based system, which can be due to protonation of oxygen atoms present in the sol-gel. Depending on reaction conditions, the metal polymers may condense to colloidal particles or they may grow to form a network gel.

Sol-gels of the present disclosure include (or are the reaction product of) one or more sol-gel components: an organosilane, a metal alkoxide, an acid, a thio-lanthanide salt, and water.

Organosilane: An organosilane of the present disclosure can be represented by Formula (I):

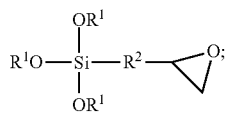
(I)

wherein each $R^1$ is independently selected from $C_1$-$C_{20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl;

$R^2$ is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

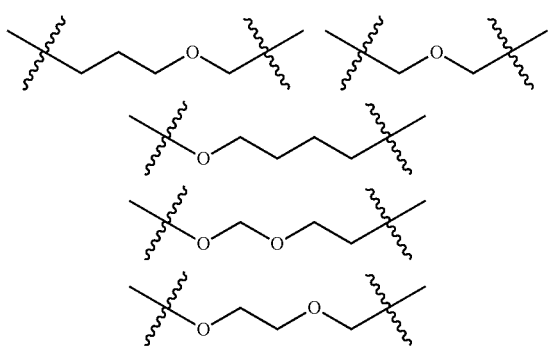

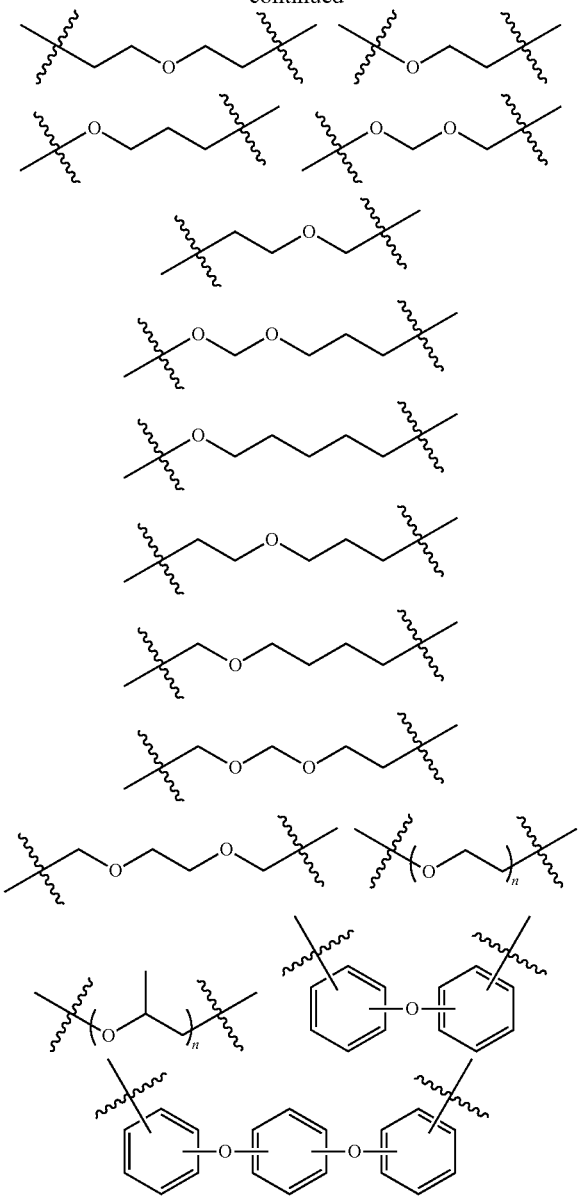

n is a positive integer. In at least one aspect, n is a positive integer and the number average molecular weight (Mn) of the ether is from about 300 to about 500, such as from about 375 to about 450, such as from about 400 to about 425.

In at least one aspect, an organosilane is (3-glycidyloxypropyl)trimethoxysilane (GTMS), (3-glycidyloxypropyl)triethoxysilane, or (3-glycidyloxypropyl)tripropoxysilane.

An organosilane can be a hydroxy organosilane. It has been discovered that a hydroxy organosilane prevents or reduces porosity and blistering of a sol-gel/primer coating on a metal surface, providing a corrosion inhibiting ability of a sol-gel film because accumulation of water within the sol-gel is prevented or reduced. Furthermore, a molar ratio of acid to metal alkoxide is about 1:1 or greater, such as about 2:1 or greater, which does not hinder (1) sol-gel formation, (2) adhesive ability of the sol-gel film upon addition of a corrosion inhibitor, or (3) anticorrosion ability of the corrosion inhibitor. Sol-gels of the present disclosure have inherent corrosion inhibiting ability, and, primers (disposed on the sol-gel) having hexavalent (VI) chromium are merely optional.

A hydroxy organosilane of sol-gels of the present disclosure provides reduced porosity and blistering of sol-gels. In at least one aspect, a hydroxy organosilane is represented by formula (II):

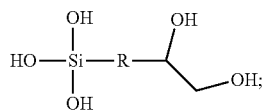

(II)

wherein R is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

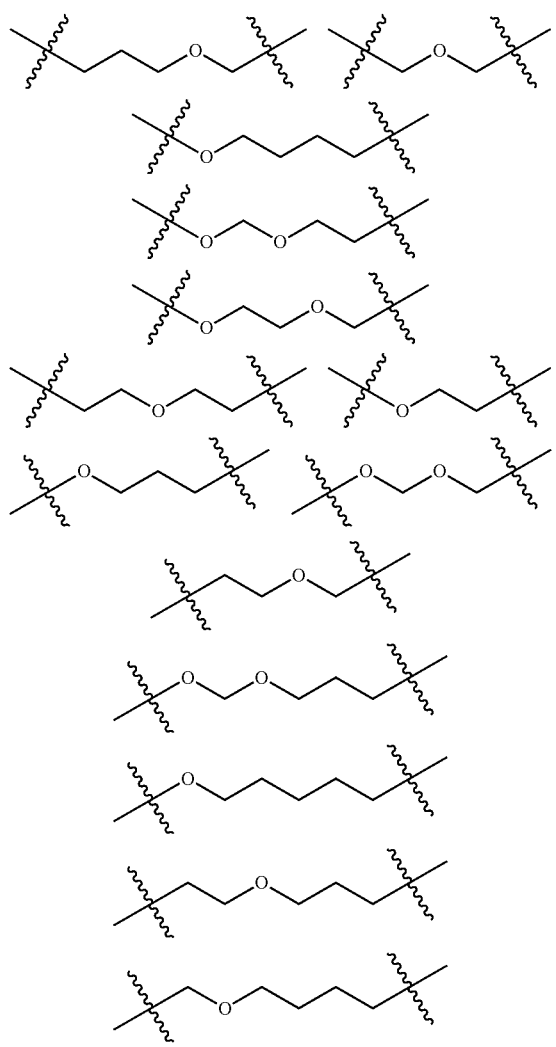

-continued

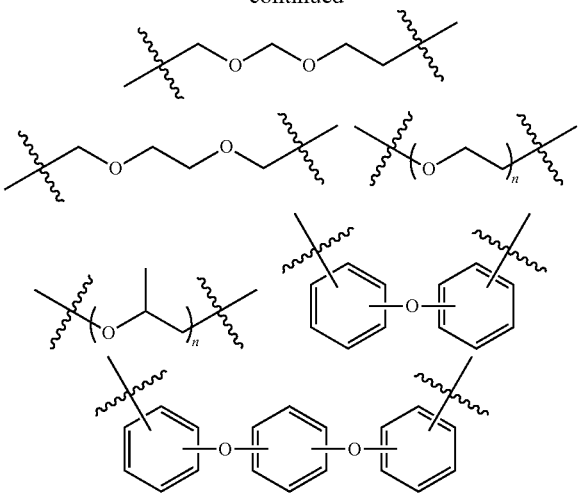

n is a positive integer. In at least one aspect, n is a positive integer and the number average molecular weight (Mn) of the ether is from about 300 to about 500, such as from about 375 to about 450, such as from about 400 to about 425.

In at least one aspect, the hydroxy organosilane is (3-(2,3-dihydroxypropoxy)propyl)silanetriol, which is represented by compound 1:

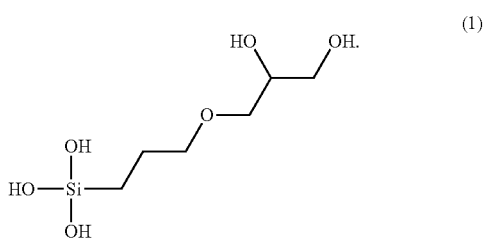 [SMILES: OCC(O)COCCC[Si](O)(O)O]

(1)

Metal alkoxide: Metal alkoxides of the present disclosure include zirconium alkoxides, titanium alkoxides, hafnium alkoxides, yttrium alkoxides, cerium alkoxides, lanthanum alkoxides, or mixtures thereof. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide. A metal alkoxide useful to form sol-gels of the present disclosure can provide metal atoms coordinated in a sol-gel for adhesive and mechanical strength.

Corrosion inhibitor: Corrosion inhibitors of the present disclosure are thio-lanthanide salts. A corrosion inhibitor useful to form sol-gels of the present disclosure can provide corrosion resistance of a metal substrate disposed adjacent the sol-gel. Metal surfaces, such as aircraft surfaces, are typically alloys having a major component, such as aluminum, and a minor component, known as an intermetallic. Intermetallics often contain copper metal which is prone to corrosion. Without being bound by theory, it is believed that the interaction of soluble thio-lanthanide salts of the present disclosure with copper-containing intermetallics on a metal surface (such as an aluminum alloy surface) prevents corrosion of the metal surface. For example, interaction of the soluble lanthanide metals of a corrosion inhibitor of the present disclosure with the intermetallics blocks reduction of the intermetallics by slowing the rate of oxygen reduction and decreasing oxidation of a metal alloy, such as an aluminum alloy.

In at least one aspect, a thio-lanthanide salt is a lanthanide (II) salt, lanthanide (III) salt, or lanthanide (IV) salt. Thio-lanthanide salts have a cation and a ligand having one or more sulfur atoms (a "thio-ligand"). The thio-ligand can be neutrally charged or anionic. The number of thio-ligands of the lanthanide salt corresponds to the oxidation state of the cation. For example, a lanthanide (II) salt will have two thio-ligands, a lanthanide (III) salt will have three thio-ligands, and a lanthanide (IV) salt will have four thio-ligands. Lanthanide salts include a cation selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu). For purposes of the present disclosure, a thio-lanthanide salt can include a cation selected from scandium (Sc), yttrium (Y), cobalt (Co), calcium (Ca), strontium (Sr), barium (Ba), and zirconium (Zr). In at least one aspect, a lanthanide is lanthanum (La), cerium (Ce), praseodymium (Pr), or yttrium (Y).

In at least one aspect, a lanthanide salt is a thio-lanthanide salt having a thio-ligand represented by Formula (III), or salt thereof:

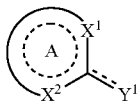

(III)

wherein:

A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$Y^1$ is selected from S or SH, wherein a dotted line represents a double bond when $Y^1$ is S or is absent when $Y^1$ is SH;

$X^1$ is selected from N, NH, O, and S;

$X^2$ is selected from N, $NR^5$, O, S, $CR^6$ and $CR^7R^8$;

$R^5$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and each of $R^6$, $R^7$ and $R^8$ is independently selected from hydrogen, halo, thiol, amino, $C_2$-$C_{10}$alkenyl, $C_2$-$C_{10}$alkynyl, aryl and heteroaryl, wherein each amino, alkyl, alkenyl, alkynyl, aryl or heteroaryl group is optionally substituted.

For the ligands represented by Formula (III), $X^1$ may be selected from N, NH, and S. $X^1$ may be selected from N and S. $X^1$ may be selected from N and NH. $X^2$ may be selected from N, NH, O, and S. $X^2$ may be selected from N, NH, and S. $X^2$ may be selected from N and NH. $X^1$ and $X^2$ may be each independently selected from N, NH and S. $X^1$ and $X^2$ may be each independently selected from N and NH. $X^1$ may be selected from N and NH, and $X^2$ may be selected from $CR^6$ and $CR^7R^8$. $X^1$ and $X^2$ may be each independently selected from $CR^6$ and $CR^7R^8$.

Ring A may be a monocyclic ring or polycyclic ring, such as a fused polycyclic ring. The A ring may be substituted mono- or bicyclic aryl, heteroaryl or heterocyclic ring, for example where a compound represented by Formula (III) is a bicyclic compound. The monocyclic aryl groups may be an optionally substituted 6 membered ring, such as benzene. The polycyclic aryl groups may be two or more optionally substituted 6-member rings fused together, such as naphthalene, anthracene, pyrene, tetracene, and pentacene. The heteroaryl groups may be selected from 5-membered monocyclic rings, such as thiophene, furan, pyrrole, silole, imidazole, 1,3-thiazole, 1,3,4-oxadiazole, 1,3,4-thiadiazole, or 6 membered rings, such as pyridine and triazine, wherein each ring may be optionally substituted.

Optional substituents of ring A may be selected from halo, cyano, amino, hydroxy, alkanoic acid, alkanoate salt, carbamoyl, $C_1$-$C_{10}$alkyloxycarbonyl, $C_1$-$C_{10}$alkyl, $C_1$-$C_{10}$haloalkyl, $C_1$-$C_{10}$alkylamino, $C_3$-$C_{10}$cycloalkyl, $C_2$-$C_{10}$alkenyl, $C_3$-$C_{10}$cycloalkenyl, $C_2$-$C_{10}$alkynyl, $C_3$-$C_{10}$cycloalkynyl, aryl, aryl $C_1$-$C_{10}$alkyl, heteroaryl and heteroaryl $C_1$-$C_{10}$alkyloxy, $C_3$-$C_{10}$cycloalkyloxy and wherein amino, alkanoic acid, alkanoic salt, alkyloxycarbonyl, alkyl, haloalkyl, alkylamino, cycloalkyl, alkenyl, cycloalkenyl, alkynyl, cycloalkynyl, aryl, arylalkyl, heteroaryl, heteroarylalkyl, alkyloxy and cycloalkyloxy in each occurrence may be optionally substituted, for example further substituted with one or more of halo, alkyl, formyl, hydroxyl, amino, nitro, or carboxylic acid. In at least one aspect, the optional substitution may be any one or more groups selected from halo, alkyl, formyl, and amino. The optional substituents may include salts of the functional groups, for example carboxylate salts.

Ring A may be heterocyclic, for example an unsaturated heterocyclic compound. Ring A may be heteroaromatic or partially unsaturated. For example, ring A may contain one or more double bonds between ring atoms. Ring A may also contain one or more optional substituents and optional fused groups. Ring A may be a monocyclic 5 or 6 membered heteroaryl or heterocyclic ring. Ring A may be a bicyclic ring comprising two rings joined together that are each independently selected from 5 and 6 membered rings. Ring A may be a bicyclic ring comprising two rings fused together that are each independently selected from 5 and 6 membered rings. Ring A may be a bicyclic heteroaryl or heterocyclic ring containing a 5 membered heterocyclic ring fused to a 6 membered aryl, carbocyclic, heterocyclic or heteroaryl ring.

In at least one aspect, A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;

$Y^1$ is selected from S or SH, wherein a dotted line represents a double bond when $Y^1$ is S or is absent when $Y^1$ is SH;

$X^1$ is selected from N, NH, O, and S;

$X^2$ is selected from N, $NR^5$, O, S, $CR^6$ and $CR^7R^8$;

$R^5$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and $R^6$, $R^7$ and $R^8$, are each independently selected from hydrogen, halo, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted.

In at least one aspect, $X^1$ is selected from N and NH, and $X^2$ is selected from $CR^6$ and $CR^7R^8$. Alternatively, $X^2$ is selected from N, NH, and S or $X^2$ is selected from N and NH. Each of $X^1$ and $X^2$ may be independently selected from N and NH.

In at least one aspect, thio-lanthanide salts of the present disclosure include a thio-ligand represented by Formula (IV), or salt thereof:

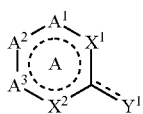

(IV)

wherein:

A, $Y^1$, $X^1$ and $X^2$ are defined according to Formula (III) as described above;

$A^1$, $A^2$ and $A^3$ are each independently selected from C=O, C=S, N, $NR^{13}$, O, S, $SO_2$, $CR^{14}$, $CR^{15}R^{16}$;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and each of $R^{14}$, $R^{15}$ and $R^{16}$ is independently selected from hydrogen, halo, thiol, amino, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted, and optionally two of $R^{13}$, $R^{14}$, $R^{15}$ and $R^{16}$ join together to form an optionally substituted aryl or heteroaryl ring fused to the A ring. In at least one aspect, $A^1$ and $A^3$ are $CR^{14}$. In another aspect, $R^{14}$ is selected from amino and thiol. In another aspect, $A^1$ and $A^3$ are each independently selected from C—SH and C—$NH_2$. In another aspect, $A^1$ and $A^3$ are C—SH. In another embodiment, $Y^1$ is SH. In another embodiment, $X^1$ and $X^2$ are N. In another embodiment, $A^2$ is N. Some specific examples of compounds of Formula (IV) include:

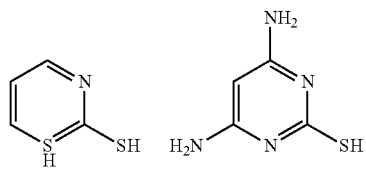

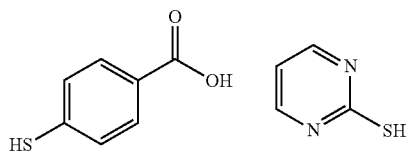

In at least one aspect, thio-lanthanide salts of the present disclosure include a thio-ligand represented by Formula (V), or salt thereof:

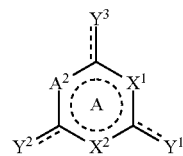

(V)

wherein:

A is a 5- or 6-membered aryl, heteroaryl or heterocyclic ring, which is optionally substituted with one or more substituents and optionally bonded to one or more aryl or heteroaryl rings, wherein a dotted line represents one or more optional double bonds;

each of $A^2$, $X^1$ and $X^2$ is independently selected from N, NH, O, and S;

each of $Y^1$, $Y^2$ and $Y^3$ is independently selected from S or SH, wherein the dotted line represents a double bond when $Y^1$ is S or is absent when $Y^1$ is SH;

$X^1$ and $X^2$ are defined according to Formula (III) as described above;

each of $A^1$, $A^2$ and $A^3$ is independently selected from C=O, C=S, N, $NR^{13}$, O, S, $SO_2$, $CR^{14}$, $CR^{15}R^{16}$; and $R^{14}$, $R^{15}$ and $R^{16}$ are defined according to Formula (IV) as described above.

In at least one aspect, $A^2$, $X^1$ and $X^2$ are N. In at least one aspect, $Y^1$, $Y^2$ and $Y^3$ are SH.

Some specific examples of compounds of Formula (V) include:

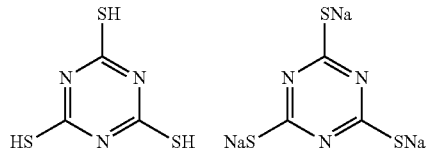

In at least one aspect, thio-lanthanide salts of the present disclosure include a thio-ligand represented by Formula (VI), or salt thereof:

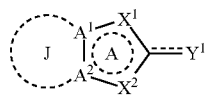

(VI)

wherein:

A ring is an optionally substituted 5-membered heterocyclic ring, wherein a dotted line represents one or more optional double bonds;

$X^1$, $X^2$ and $Y^1$ are defined according to Formula (III) as described above;

each of $A^1$ and $A^2$ is independently selected from C=O, C=S, N, $NR^{13}$, O, S, $SO_2$, $CR^{14}$ and $CR^{15}R^{16}$; and are optionally joined together to form an optionally substituted aryl, heteroaryl or heterocyclic ring J that is fused to the A ring;

$R^{13}$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and each of $R^{14}$, $R^{15}$ and $R^{16}$ is independently selected from hydrogen, halo, amino, $C_1$-$C_{10}$alkyl $C_2$-$C_{10}$alkynyl, aryl and heteroaryl, wherein each amino, alkyl, alkenyl, alkynyl, aryl or heteroaryl group may be optionally substituted, and optionally two of $R^{13}$, $R^{14}$, $R^{15}$ and $R^{16}$, join together to form an optionally substituted aryl or heteroaryl ring fused to the A ring.

Some specific examples of compounds of Formula (VI) include:

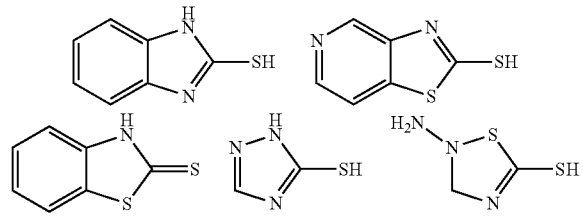

In at least one aspect, thio-lanthanide salts of the present disclosure include a thio-ligand represented by Formula (VII) are provided as follows:

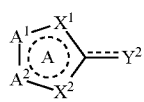

(VII)

wherein:
A ring is an optionally substituted 5-membered heterocyclic ring, wherein a dotted line represents one or more optional double bonds;
$X^1$, $X^2$ and $Y^1$ are defined according to Formula (VI) as described above;
$A^1$ and $A^2$ are independently selected from N, $NR^{13}$, O, S, $CR^{14}$ and $CR^{15}R^{16}$;
$R^{13}$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and
$R^{14}$, $R^{15}$ and $R^{16}$ are defined according to Formula (VI) as described above.

Some specific examples of compounds of Formula (VII) include:

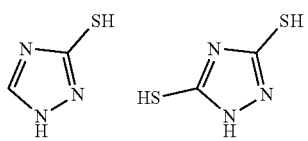 [SMILES: Sc1nc[nH]n1 ; Sc1n[nH]c(S)n1]

In at least one aspect, thio-lanthanide salts of the present disclosure include a thio-ligand represented by Formula (VIII), or a salt thereof:

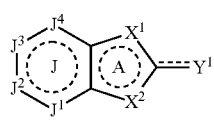

(VIII)

wherein:
A ring is an optionally substituted 5-membered heterocyclic ring and J ring is an optionally substituted 6-membered aryl or heterocyclic ring, wherein a dotted line represents one or more optional double bonds;
$X^1$, $X^2$ and $Y^1$ are defined according to Formula (VI) as described above;
each of $J^1$, $J^2$, $J^3$ and $J^4$ is independently selected from N, $NR^{13}$, O, S, $CR^{14}$ and $CR^{15}R^{16}$;
$R^{13}$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and
each of $R^{14}$, $R^{15}$ and $R^{16}$ is independently selected from hydrogen, halo, amino, $C_1$-$C_{10}$alkyl $C_2$-$C_{10}$alkynyl, aryl and heteroaryl, wherein each amino, alkyl, alkenyl, alkynyl, aryl or heteroaryl group may be optionally substituted.

Some specific examples of compounds of Formula (VIII) include:

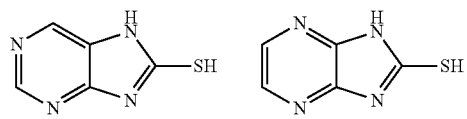 [SMILES: Sc1nc2ncncc2[nH]1 ; Sc1nc2nccnc2[nH]1]

Chemical compounds of the present disclosure (such as thio-ligands) may exist as one or more stereoisomers. The various stereoisomers can include enantiomers, diastereomers and geometric isomers. Accordingly, the present disclosure comprises mixtures, individual stereoisomers, and optically active mixtures of the compounds described herein.

Some specific examples of heteroaryl and heterocyclic organic compounds of Formula (III) are shown in Table 1 as follows:

| Ref. No. | Chemical Name | Chemical Structure |
|---|---|---|
| 1 | 2-mercaptobenzimidazole (MBI) | |
| 2 | 3a,4-dihydrothiazolo[4,5-c]pyridine-2-thiol | |
| 3 | Benzo[d]thiazole-2(3H)-thione | |
| 4 | 1H-1,2,4-triazole-5-thiol | |
| 5 | 2-amino-5-mercapto-1,2,4-thiadiazole | |
| 6 | 5-methyl-2-mercapto-1,3,4-thiadiazole | |

| Ref. No. | Chemical Name | Chemical Structure |
|---|---|---|
| 7 | 4-amino-5-phenyl-3-mercapto-1,2,4-triazole | |
| 8 | 5-mercapto-1-tetrazole-1H-acetic acid, sodium salt | |
| 9 | 4,6-diamino-2-mercaptopyrimidine | |
| 10 | 4-amino-2-mercaptopyrimidine | |
| 11 | 2,6-diamino-4-mercaptopyrimidine | |
| 12 | 9H-purine-8-thiol | |
| 13 | 1H-imidazo[4,5-b]pyrazine-2-thiol | |
| 14 | S-triazolo-[4,3-a]-pyridine-3-thione | |
| 15 | 2-mercaptobenzimidazole | |
| 16 | 1,2,4-triazole-3-thiol | |
| 17 | 3-amino-5-mercapto-1,2,4-triazole | |
| 18 | 2-mercaptopyrimidine | |
| 19 | 2-mercaptonicotinate, sodium salt | |
| 20 | 4-mercaptobenzoate, sodium salt | |
| 21 | 6-mercaptonicotinate, sodium salt | |
| 22 | 1,3,5-triazine-2,4,6-trithiol | |
| 23 | 1,3,5-triazine-2,4,6-trithiol, trisodium salt | |

In at least one aspect, the thio-lanthanide salts are a metal-organic framework (MOF). MOFs are one-, two- or three-dimensional structures provided by an organometallic polymeric framework comprising a plurality of lanthanide metal ions or metal clusters each coordinated to one or more ligands (thio-lanthanides). MOFs may provide porous structures comprising a plurality of pores. The MOFs may be crystalline or amorphous. For example a one-, two- or three-dimensional MOF structure may be amorphous or crystalline. Metal clusters include two or more metal ions linked in part by metal-metal bonds. One dimensional structures include, for example, a linear structure of metal atoms linked by the ligands. Two dimensional structures include, for example, a sheet or layer structure having length and width (e.g. area) dimensions of metal atoms linked by the ligands. Three dimensional structures include, for example, a sphere or cube structure having length, width and height (e.g. volume) dimensions of metal atoms linked by organic ligands. The one-, two- or three-dimensional MOF structures may be at least partially amorphous or at least partially crystalline, for example a MOF having regions having a degree of crystallinity and regions having amorphous properties. In one aspect, the MOFs provided are two-dimensional and/or three-dimensional structures. In one aspect, the MOFs are crystalline, and may for example comprise an appropriate amount of homogeneity. In another embodiment, the MOFs are amorphous, for example as described in the article entitled "Amorphous Metal-Organic Frameworks", Bennett et al, Accounts of Chemical Research, ACS publications, published 7 Apr. 2014. It will be appreciated that crystalline MOFs are porous frameworks comprising an array of metal nodes connected by organic ligands. Amorphous MOFs still retain the basic building blocks and connectivity of their crystalline counterparts, though they lack any long-range periodic order. Ligands, in addition to the thio-ligands, can include organic ligands that are typically selected from heterocyclic compounds, which may be optionally substituted and optionally fused with one or more substituents or groups. Metal organic frameworks can incorporate other ligands with the metals or metal clusters in addition to the organic ligands, for example anions such as acetate or halides may provide additional ligands, and for example may originate from metal salts used to form the MOFs.

Non-limiting suitable MOFs are described in the Chemical Reviews article by A Betard and R Fischer entitled "Metal-Organic Framework Thin Films: From Fundamentals to Applications", Chem. Rev. (2012), 112(2), 1055-1083 and Yaghi et al, Acc. Chem. Res. (2001), 34, 319-330. For example, suitable MOFs can be selected from those with zeolite-net-like topologies, namely zeolite-net-like metal-organic frameworks (ZMOFs). In at least one aspect, the MOFs are a zeolitic imidazolate framework (ZIF). The MOFs may have isoreticular expansion on frameworks. The MOFs may utilize single metal ion based molecular building blocks (MBBs) with coordination including chelation (and heterochelation) and bridging from organic heterocyclic ligands, which contain coordination and bridging functionality, and which may together form secondary building units (SBUs). A plurality of SBUs together forms the metal organic framework, which can provide three-dimensional porous structures with substantially uniform channels and cages. The MOFs are typically formed as solidified particles from reactions involving metal salts, organic ligands and suitable solvents.

In one embodiment, a metal-ligand directed assembly approach can be used to form MOFs with rigid secondary building units (SBUs), such as rigid tetrahedral SBUs. Properties such as pore size for the MOFs can be modified by selection of suitable reagents, for example selection of various metal salts to include different metal cations and counter anions, different organic heterocyclic ligands, solvents and structure directing agents (SDAs).

In another embodiment, the MOFs comprise a plurality of molecular building blocks (MBB) each having a metal cluster that together with one or more organic ligands forms secondary building units (SBU) that are each connected together into a network. It will be appreciated that the configuration and connection of SBUs into a framework are described by topologies that are also called a "net", which are commonly assigned three letter symbols (e.g. "pcu net") as provided in the database of Reticular Chemistry Structure Resource. The MOFs may be based on single metals as vertices in the framework.

MOFs may also be formed by seeding with agents. For example, silicon and titania nanoparticles or microspheres may be used as seeding agents. Methods of forming MOFs using seeding or crystallisation agents are described in WO2011/133999 (PCT/AU2010/001056).

MOFs may also be formed by flow chemistry processes, for example as described in the article entitled "Versatile, High Quality and Scalable Continuous Flow Production of Metal-Organic Frameworks", Rubio-Martinez et al, Scientific Reports, published online 25 Jun. 2014.

The MOFs may be modified by post-synthetic process. For example, formation of mixed metal or alternative guest molecules. MOFs may also be formed and then modified using ligand exchange processes. Methods of forming MOFs using ligand exchange processes are described in the article entitled "Postsynthetic ligand exchange for the synthesis of benzotriazole-containing zeolitic imidazolate framework", Jiang et al, Chem. Commun., published online 2 Mar. 2015.

In at least one embodiment, a MOF is coordination network with organic ligands containing potential voids.

The MOFs can be formed as solid particles that are suitable for dispersion in compositions of the present disclosure. In at least one aspect, the average diameter of the MOF particles is in a range of 20 nm to 50 µm, 40 nm to 30 µm, 60 nm to 10 µm, 80 nm to 5 µm, or 100 nm to 1 µm. In one embodiment, the average diameter of the MOF particles is In a range of 100 nm to 1 µm.

In at least one aspect, a MOF structure is formed by mixing a ligand (such as a thiol ligand of the present disclosure) with a metal nitrate in a methanol/dimethyl formamide solution. The molar ratio of ligand to metal nitrate can be about 3:1 or greater. After stirring the solution for about 1 hour at a temperature from about 60° C. to about 80° C., stirring can be stopped, followed by the addition of triethylamine to the solution, and the temperature of the solution can be maintained for about 24 hours.

In at least one aspect, a weight fraction (wt %) of (metal alkoxide+organosilane+acid) in the sol-gel is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 3 wt %, about 10 wt %, about 12 wt %, about 15 wt %. A greater amount of (metal alkoxide+organosilane+acid) can provide greater amounts of corrosion inhibitor to be present in the sol-gel. A weight fraction (wt %) of corrosion inhibitor in the sol-gel is from about 0.1 wt % to about 500 wt %, such as from about 0.2 wt % to about 50 wt %, such as from about 0.5 wt % to about 35 wt %, such as from about 1 wt % to about 30 wt %, such as from about 2 wt % to about 25 wt %, such as from about 3 wt % to about 10 wt %, for example about 4 wt %, about 5 wt %, about 7 wt %, about 10 wt, about 15 wt %. Because of the improved solubility of corrosion inhibitors of the present disclosure, a greater ratio of corrosion inhibitor to binder (i.e., metal alkoxide+organosilane+acid) can be used as compared to corrosion inhibitors having a lower solubility in a sol-gel. In addition, because of the improved solubility of corrosion inhibitors of the present disclosure in sol-gels, a smaller ratio of corrosion inhibitor to binder (i.e., metal alkoxide+organosilane+acid) can be used as compared to corrosion inhibitors having a lower solubility in a sol-gel. In at least one aspect, a ratio of corrosion inhibitor to binder is from about 1:1 to about 5:1 by weight, such as from about 2:1 to about 4:1 by weight, such as from about 2:1 to about 3:1 by weight. Alternatively, a ratio of corrosion inhibitor to binder is from about 0.01:1 to about 0.5:1 by weight, such as from about 0.05:1 to about 0.4:1 by weight, such as from about 0.1:1 to about 0.3:1 by weight, such as from about 0.01:1 to about 0.05:1 by weight.

In embodiments where a sol-gel of the present disclosure is used as a coating on a component of an aircraft, less than 50 wt % of the salt in the sol-gel is preferred to ensure that the concentration is not greater than the critical pigment volume concentration (CPVC) of the inhibitor in the coating. Exceeding the CPVC of the coating can hinder some coating properties, such as porosity.

The solubility of corrosion inhibitors of the present disclosure provides a reduced solids content of a sol-gel, as compared to a sol-gel having conventional corrosion inhibitors of low solubility. In at least one aspect, a sol-gel of the present disclosure has a solids content of about 1 wt % or less, such as about 0.5 wt % or less, such as about 0.1 wt % or less, based on the total weight of the sol-gel, as determined by gravimetric analysis. Gravimetric analysis includes drying (to dryness) a sol-gel formulation with 1-10 wt. % soluble inhibitors in an oven and recording mass weight before and after drying.

In at least one aspect, a corrosion inhibitor of the present disclosure has a solubility of about 1 gram (g) or greater per gram of sol-gel, such as about 2 g or greater per gram of sol-gel at 23° C., such as about 3 g or greater per gram of sol-gel, such as about 4 g or greater per gram of sol-gel.

It has been discovered that corrosion inhibitors of the present disclosure are, unlike conventional corrosion inhibitors, readily soluble in the aqueous sol-gel and, as such, can diffuse through the sol-gel to protect the metal substrate from corrosion. The soluble corrosion inhibitors of the present disclosure provide greater inhibitor efficiency as compared to insoluble corrosion inhibitors and provide lower concentrations of corrosion inhibitor in a sol-gel, as compared to insoluble corrosion inhibitors in a sol-gel. Soluble corrosion inhibitors also provide sol-gel coatings with more uniformity and lower porosity as compared to sol-gel coatings having insoluble corrosion inhibitors.

Add: An acid (e.g., acid stabilizer) used to form sol-gels of the present disclosure provides stabilization of a metal alkoxide and a corrosion inhibitor of the sol-gel as well as pH reduction of the sol-gel. The pH value of a sol-gel (and composition that forms the sol-gel) can be controlled by use of an acid. Acid stabilizers of the present disclosure include organic acids. Organic acids include acetic acid (such as glacial acetic acid) or citric acid. Less acidic acid stabilizers may also be used, such as glycols, ethoxyethanol, or $H_2NCH_2CH_2OH$.

In at least one aspect, a molar ratio of acid to metal alkoxide is from about 1:1 to about 40:1, such as from about 3:1 to about 8:1, such as from about 4:1 to about 6:1, such as from about 4:1 to about 5:1. In at least one aspect, a pH of a sol-gel of the present disclosure is from about # to about #.

Without being bound by theory, it is believed that acid in these ratios not only contributes to stabilizing a metal alkoxide for hydrolysis, but can also protonate a corrosion inhibitor, which promotes solubility of the corrosion inhibitor in the sol-gel. Solubility of a corrosion inhibitor of the present disclosure is further promoted by use of a hydroxy organosilane in the sol-gel because hydroxy moieties of a hydroxy organosilane can chelate to cationic moieties of a corrosion inhibitor. Due to the improved solubility of corrosion inhibitors in a sol-gel (and reduced solids content of a sol-gel), a corrosion inhibitor of the present disclosure can move through the sol-gel and perform corrosion inhibition at, for example, a metal substrate surface.

Sol-gel components of the present disclosure, such as corrosion inhibitors, may be dissolved in one or more solvents before being added to a mixture containing other sol-gel components. Conventional corrosion inhibitors, for example, generally have limited solubility and are typically suspended in water and aqueous solvents, emulsified, and/or dispersed within incompatible solutions and/or solvents. Corrosion inhibitors of the present disclosure can be dissolved in water or an aqueous solution. In at least one aspect, a sol-gel of the present disclosure comprises about 50 wt % or greater of water, such as about 60 wt % or greater, such as about 70 wt % or greater, such as about 80 wt % or greater, such as about 90 wt % or greater, such as about 95 wt % or greater, based on the total weight of the sol-gel.

Additionally or alternatively, a corrosion inhibitor can be dissolved, suspended, emulsified, and/or dispersed in an organic solvent such as an alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), or mixtures thereof. Upon curing, e.g. heating, of a mixture containing the sol-gel components, some or all of the solvent(s) can be removed from the sol-gel/mixture.

Sol-Del Systems

FIG. 1 is a side view of a corrosion-inhibiting sol-gel disposed on a substrate. As shown in FIG. 1, a corrosion-inhibiting sol-gel system 100 comprises a sol-gel 102 disposed on a substrate 104. Substrate 104 can be a metal substrate. Sol-gel 102 has corrosion inhibiting properties which can provide corrosion protection of substrate 104 if, for example, substrate 104 is a metal substrate. Sol-gel 102 promotes adherence between substrate 104 and a secondary layer 106. Secondary layer 106 can be a sealant or paint.

Substrate 104 can be any suitable material and/or can include any suitable structure that can benefit from sol-gel 102 being disposed thereon. Substrate 104 may define one or more components (such as structural or mechanical components) of environmentally exposed apparatuses, such as aircraft, watercraft, spacecraft, land vehicles, equipment, wind turbines, and/or another suitable apparatus. Metal substrate 104 can be part of a larger structure, such as a component, such as a vehicle component. A vehicle component is any suitable component of a vehicle, such as a structural component, such as a panel or joint, of an aircraft, automobile, etc. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. Substrate 104 can be a metal substrate made of aluminum, aluminum alloy, nickel, iron, iron alloy, steel, titanium, titanium alloy, copper, copper alloy, or mixtures thereof. Substrate 104 can be a 'bare' substrate, having no plating (e.g., unplated metal), conversion coating, and/or corrosion protection between substrate 104 and sol-gel 102. Additionally or alternatively, substrate 104 can include surface oxidization. Hence, sol-gel 102 can be directly bonded to substrate 104 and/or to a surface oxide layer on a surface of substrate 104.

Secondary layer 106 is disposed on a second surface 110 of sol-gel 102 opposite first surface 108 of sol-gel 102. In at least one aspect, sol-gel 102 has a thickness that is less than the thickness of substrate 104. In at least one aspect, sol-gel 102 has a thickness of from about 1 μm (microns) to about 500 nm, such as from about 5 μm to about 100 nm, such as from about 10 μm to about 100 μm. Thinner coatings may have fewer defects (more likely to be defect free), while thicker coatings may provide more abrasion, electrical, and/or thermal protection to the underlying substrate 104.

In at least one aspect, secondary layer 106 includes organic material (e.g., organic chemical compositions) configured to bind and/or adhere to sol-gel 102. Secondary layer 106 includes a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. In at least one aspect, secondary layer 106 includes a polymer, a resin, a thermoset polymer, a thermoplastic polymer, an epoxy, a lacquer, a polyurethane, a polyester, or combinations thereof. Secondary layer 106 can additionally include a pigment, a binder, a surfactant, a diluent, a solvent, a particulate (e.g., mineral fillers), fibers (e.g., carbon, aramid, and/or glass fibers), or combinations thereof.

Methods of Making Sol-Gel

Methods of forming a sol-gel of the present disclosure include mixing a metal alkoxide, acetic acid, and water, followed by stirring for from about 1 minute to about 1 hour, such as about 30 minutes. An organosilane is then added to the mixture and stirred for from about 1 minute to about 1 hour, such as about 30 minutes. A corrosion inhibitor is added to the mixture. The mixture can be deposited onto a substrate, such as a metal substrate. The deposited mixture may be cured at ambient temperature or can be heated to increase the rate of curing/sol-gel formation.

Figure 2:
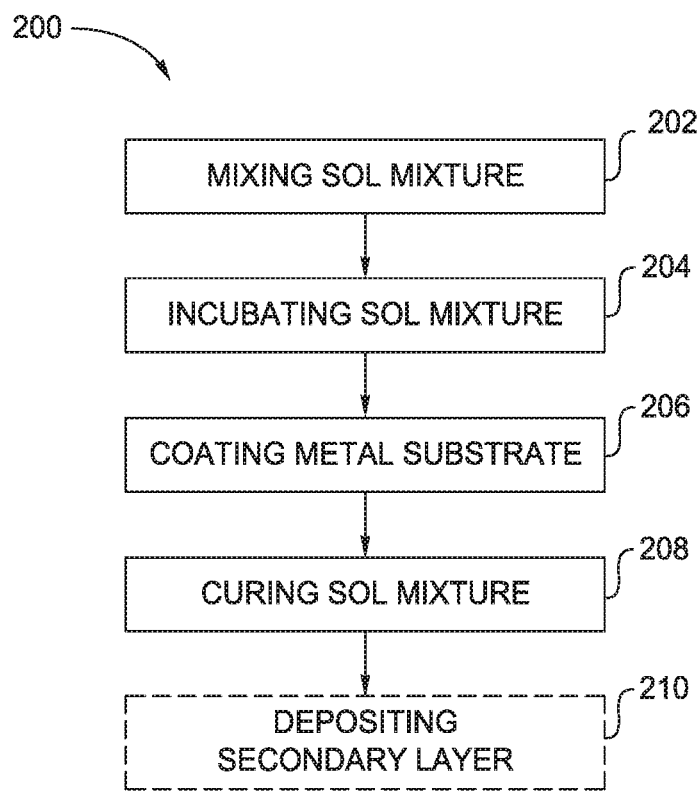
FIG. 2 is a flow chart of a method of forming a sol-gel.

FIG. 2 is a flow chart illustrating a method 200 of forming a sol-gel 102. At block 202, sol-gel 102 is formed by mixing one or more sol-gel components. Sol-gel components include two or more of organosilane, metal alkoxide, acid, and corrosion inhibitor. Curing the mixed components forms sol-gel 102 (at block 208).

Generally, mixing is performed by combining the sol-gel components (e.g., dissolving) and optionally stirring the sol-gel components. Further, mixing generally includes mixing the sol-gel components in amounts and/or ratios sufficient to provide an active sol solution that may react to form the sol-gel.

Mixing includes mixing the sol-gel components to form a mixture (e.g., a solution, an emulsion, a suspension, or a colloid). In at least one aspect, mixing includes mixing all sol-gel components together concurrently. Alternatively, mixing includes mixing any two components (e.g., metal alkoxide and acid) to form a first mixture and then mixing the remaining components into the first mixture to form a second mixture.

Mixing can include dissolving, suspending, emulsifying, and/or dispersing the corrosion inhibitor in a solvent before mixing with one or more of the other sol-gel components. Examples of solvents for dissolving, suspending, emulsifying, and/or dispersing sol-gel components include water, an alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures thereof. Additionally or alternatively, mixing can include mixing the corrosion inhibitor as a solid, an aggregate, and/or a powder with one or more of the other sol-gel components. Where, for example, mixing includes mixing solids, powders, and/or viscous liquids, mixing can include mixing with a high-shear mixer (e.g., a paint shaker or a planetary-centrifugal mixer or stirrer). A high-shear mixer may be advantageous to break and/or to finely disperse solids to form a substantially uniform mixture. For example, a high-shear mixer can dissolve, suspend, emulsify, disperse, homogenize, deagglomerate, and/or disintegrate solids into the sol solution.

Generally mixing includes mixing two or more sol-gel components to form a mixture. The sol-gel components can be dilute to control self-condensation reactions and thus increase the pot life of the mixed sol solution. Mixing can include mixing and a weight percent (wt %) of the corrosion inhibitor in the mixture that is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %. Mixing includes mixing and the weight fraction (wt %) of (metal alkoxide+hydroxy organosilane+acid) in the mixture is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %.

In at least one aspect, a molar ratio of acid to metal alkoxide is from about 1:1 to about 40:1, such as from about 3:1 to about 8:1, such as from about 4:1 to about 6:1, such as from about 4:1 to about 5:1. In at least one aspect, a ratio of corrosion inhibitor to binder is from about 1:1 to about 5:1 by weight, such as from about 2:1 to about 4:1 by weight, such as from about 2:1 to about 3:1 by weight. Alternatively, a ratio of corrosion inhibitor to binder is from about 0.01:1 to about 0.5:1 by weight, such as from about 0.05:1 to about 0.4:1 by weight, such as from about 0.1:1 to about 0.3:1 by weight, such as from about 0.01:1 to about 0.05:1 by weight.

At block 204, method 200 includes incubating the mixture of sol-gel components for a period of time, such as from about 1 minute to about 60 minutes, such as from about 5 minutes to about 30 minutes, such as from about 10 minutes to about 20 minutes. Furthermore, pot-life is the period of time from the mixing until the sol-gel is formed (e.g., the mixture becomes too viscous to be usable at ambient temperature). The pot life can be from about 1 hour to about 24 hours, such as from about 2 hours to about 8 hours, such as about 4 hours. Incubating may be performed under ambient conditions (e.g., at room temperature) and/or at elevated temperature. Suitable incubation temperatures include from about 10° C. to about 100° C., such as from about 20° C. to about 70° C., such as from about 30° C. to about 50° C., for example about 40° C.

In at least one aspect, at block 206, method 200 includes coating substrate 104 with a mixture comprising sol-gel components (Block 206) and incubating the mixture (Block 204). Incubating includes, after mixing the mixture comprising sol-gel components and allowing the mixture comprising sol-gel components to stand at room temperature for 30 minutes or more. At block 206, coating can include wetting the substrate 104 with a mixture comprising sol-gel components, for example, by spraying, immersing, brushing, and/or wiping the mixture comprising sol-gel components onto substrate 104. For example, suitable forms of spraying include spraying with a spray gun, high-volume, low-pressure spray gun, and/or hand pump sprayer. The mixture comprising sol-gel components is allowed to drain from the wetted substrate 104 for a few minutes (e.g., 1-30 minutes, 1-10 minutes, or 3-10 minutes) and, if necessary, excess, undrained mixture may be blotted off substrate 104 and/or gently blown off substrate 104 by compressed air.

In at least one aspect, at block 206, coating includes cleaning and/or pretreating substrate 104 before wetting the substrate with the mixture comprising sol-gel components.

Generally, sol-gel 102 adheres and/or bonds better with a clean, bare substrate (e.g., metal substrate), substantially free from dirt, surface oxides, and/or corrosion products. Cleaning can include degreasing, an alkaline wash, chemical etching, chemically deoxidizing, and/or mechanically deoxidizing (e.g., sanding and/or abrading). Coating does not typically include coating substrate 104 with an undercoating or forming a chemical conversion coating on substrate 104. Instead, in most aspects, coating typically includes directly coating the (bare) substrate 104.

In at least one aspect, methods of the present disclosure include curing a mixture comprising sol-gel components. At block 208, curing can include drying a mixture comprising sol-gel components disposed on substrate 104 and may be performed under ambient conditions (e.g., at room temperature) and/or at elevated temperature. In at least one aspect, a curing temperature is from about 10° C. to about 150° C., such as from about 20° C. to about 100° C., such as from about 30° C. to about 70° C., such as from about 40° C. to about 50° C. Curing can be performed for a period of time, such as from about 1 minute to about 48 hours, such as from about 5 minutes to about 24 hours, such as from about 10 minutes to about 8 hours, such as from about 30 minutes to about 4 hours, for example about 1 hour.

After coating and/or curing, the sol-gel is suitable for exposure to an external environment and/or for application of a secondary layer 106. At block 210, method 200 includes depositing a secondary layer 106 of organic material can be performed before curing (Block 208) is completed, for example, depositing (at block 210) a secondary layer 106 can be performed at least partially concurrently with curing (at block 208). Depositing can include painting, spraying, immersing, contacting, adhering, and/or bonding sol-gel 102 with the organic material to form secondary layer 106. A secondary layer includes a paint, a fiber-reinforced plastic, or other suitable organic material.

Aspects

Clause 1. A sol-gel comprising:
an organosilane
a metal alkoxide;
an acid;
a thio-lanthanide salt having a solubility of about 1 gram or greater per gram of sol-gel at 23° C.; and
water.

Clause 2. The sol-gel of Clause 1, wherein the thio-lanthanide salt comprises a ligand represented by Formula (III), or salt thereof:

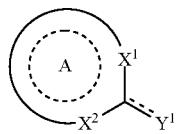

(III)

wherein:
A is a 5- or 6-membered aryl, heteroaryl or heterocyclic ring, which is optionally substituted with one or more substituents and optionally fused with one or more aryl or heteroaryl rings, wherein a dotted line represents one or more optional double bonds;
$Y^1$ is selected from S or SH, wherein a dotted line represents a double bond when $Y^1$ is S or is absent when $Y^1$ is SH;
$X^1$ is selected from N, NH, O, and S;
$X^2$ is selected from N, $NR^5$, O, S, $CR^6$ and $CR^7R^8$;

$R^5$ is selected from hydrogen, amino, $C_1$-$C_{10}$alkyl, $C_2$-$C_{10}$alkenyl, $C_2$-$C_{10}$alkynyl, aryl and heteroaryl, wherein each amino, alkyl, alkenyl, alkynyl, aryl or heteroaryl group may be optionally substituted; and each of $R^6$, $R^7$ and $R^8$ is independently selected from hydrogen, halo, thiol, amino, $C_2$-$C_{10}$alkenyl, $C_2$-$C_{10}$alkynyl, aryl and heteroaryl, wherein each amino, alkyl, alkenyl, alkynyl, aryl or heteroaryl group is optionally substituted.

Clause 3. The sol-gel of Clauses 1 or 2, wherein the lanthanide salt comprises a cation selected from lanthanum, cerium, praseodymium, neodymium, promethium, samarium, europium, gadolinium, terbium, dysprosium, holmium, erbium, thulium, ytterbium, lutetium, scandium, yttrium, cobalt, calcium, strontium, barium, and zirconium.

Clause 4. The sol-gel of any of Clauses 1-3, wherein the lanthanide salt comprises a cation selected from cerium, praseodymium, or yttrium.

Clause 5. The sol-gel of any of Clauses 1-4, wherein a weight fraction of the lanthanide salt in the sol-gel is from about 0.2 wt % to about 50 wt %.

Clause 6. The sol-gel of any of Clauses 1-5, wherein a ratio of lanthanide salt to the sum of metal alkoxide, organosilane, and acid is from about 0.01:1 to about 0.5:1 by weight.

Clause 7. The sol-gel of any of Clauses 1-6, wherein a ratio of lanthanide salt to (metal alkoxide+organosilane+acid) is from about 1:1 to about 5:1 by weight.

Clause 8. The sol-gel of any of Clauses 1-7, wherein the sol-gel has a solids content of about 1 wt % or less, based on the total weight of the sol-gel.

Clause 9. The sol-gel of any of Clauses 1-8, wherein the sol-gel comprises about 80 wt % or greater of water.

Clause 10. The sol-gel of any of Clauses 1-9, wherein the organosilane is represented by Formula (I):

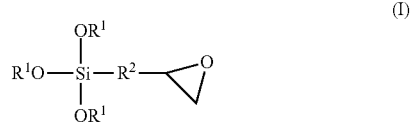

(I)

wherein:
each $R^1$ is independently selected from $C_1$-$C_{20}$ alkyl; and
$R^2$ is selected from alkyl, cycloalkyl, ether, and aryl.

Clause 11. The sol-gel of any of Clauses 1-9, wherein the organosilane is represented by Formula (II):

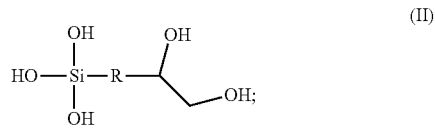

(II)

wherein R is selected from alkyl, cycloalkyl, ether, and aryl.

Clause 12. The sol-gel of Clause 11, wherein the organosilane is:

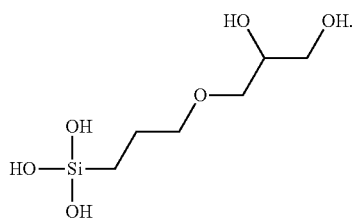 [SMILES: OCC(O)COCCC[Si](O)(O)O]

Clause 13. The sol-gel of claim 1, wherein the metal alkoxide is selected from the group comprising zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and mixtures thereof.

Clause 14. The sol-gel of any of Clauses 1-13, wherein the acid is acetic acid.

Clause 15. The sol-gel of any of Clauses 1-14, wherein a weight fraction of the sum of metal alkoxide, hydroxy organosilane, and acid in the sol-gel is at least 4 wt %.

Clause 16. The sol-gel of any of Clauses 1-15, wherein the weight fraction is at least 15 wt %.

Clause 17. A component comprising:
a metal substrate; and
the sol-gel of any of Clauses 1-16 disposed on the metal substrate.

Clause 18. The component of Clause 17, further comprising a secondary layer disposed on the sol-gel.

Clause 19. The component of Clauses 17 or 18, wherein the secondary layer is an epoxy coating or urethane coating.

Clause 20. The component of any of Clauses 17-19, wherein the component is a vehicle component selected from an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and an internal component.

Clause 21. The component of any of Clauses 17-20, wherein the metal substrate is selected from aluminum, aluminum alloy, nickel, iron, iron alloy, steel, titanium, titanium alloy, copper, copper alloy, and mixtures thereof.

Clause 22. A method of forming a sol-gel, comprising:
mixing a metal alkoxide and an acid to form a first mixture;
mixing with the first mixture an organosilane to form a second mixture; and
mixing a thio-lanthanide salt with the second mixture to form a third mixture.

Clause 23. The method of Clause 22, further comprising depositing the first mixture, the second mixture, or the third mixture onto a metal substrate.

Clause 24. The method of Clauses 22 or 23, further comprising curing the third mixture.

Clause 25. The method of any of Clauses 22-24, further comprising cleaning the metal substrate by degreasing, alkaline washing, chemical etching, chemically deoxidizing, and/or mechanically deoxidizing the metal surface prior to depositing.

Clause 26. The method of any of Clauses 22-25, further comprising depositing a secondary layer onto the sol-gel.

EXAMPLES

Experimental: Materials: Cerium (III) nitrate hexahydrate and praseodymium (III) nitrate hexahydrate were obtained from Sigma-Aldrich of St. Louis, Mo. 3% AC-131 kit was obtained from 3M. 3% AC-131 is a non-chromate conversion coating for use on aluminum, nickel, stainless steel, magnesium, and titanium alloys. AC-131 has a Part A, which is an aqueous mixture of acetic acid and zirconium tetra-n-propoxide (TPOZ), and a Part B, which is GTMS. The two components are mixed together (Part A+Part B) and the molar ratio of silicon to zirconium in the mixture is 2.77:1. A molar ratio of acetic acid to TPOZ in Part A is 0.45:1.

Glacial acetic acid (GAA) and Glycidoxypropyl-trimethoxy-silane (GTMS) were obtained from Sigma-Aldrich. Zirconium tetra-n-propoxide (TPOZ; 70% in n-propanol) was obtained from Sigma-Aldrich. Antarox BL-240 (pre-mixed, 10% wt in water) is a linear alcohol ethylene oxide (EO)/propylene-oxide (PO) wetting agent and was obtained from Solvay Chemicals. An epoxy, non-chromate primer was obtained from Hentzen Coatings, Inc.

Synthesis of Inhibitors:

Ce(Triazole thiol)$_3$: 5 g of triazole thiol was dissolved in 200 mL of isopropyl alcohol (IPA), and the mixture was refluxed at 80° C. for 1 hour. 7.16 g of cerium nitrate hexahydrate was dissolved in 200 mL of isopropyl alcohol and was added to the mixture of triazole thiol and isopropyl alcohol. This mixture was refluxed overnight at 80° C. The isopropyl alcohol solvent was then evaporated by rotary evaporation and the product was vacuum dried in an oven at 70° C.

Pr(Triazole thiol)$_3$: 5 g of triazole thiol was dissolved in 200 mL of isopropyl alcohol (IPA), and the mixture was refluxed at 80° C. for 1 hour. 6.87 g of praseodymium nitrate hexahydrate was dissolved in 200 mL of isopropyl alcohol and was added to the mixture of triazole thiol and isopropyl alcohol. This mixture was refluxed overnight at 80° C. The isopropyl alcohol solvent was then evaporated by rotary evaporation and the product was vacuum dried in an oven at 70° C.

Ce(triazole thiol)$_3$ and Pr(triazole thiol)$_3$ were dissolved in a 15% sol-gel (according to Table 1). It was discovered that both salts are very soluble in the sol-gel. About 1 to 6 g of the salts fully dissolve in 1 g of the sol-gel by mixing the solution at room temperature with gentle agitation.

TABLE 1

| Example | CRB | Lanthanide salt | GAA (mL) | TPOZ (mL) | Water (mL) | GTMS (mL) | BL-240 (mL) |
|---|---|---|---|---|---|---|---|
| 1 | 15% sol-gel 10 wt % lanthanide salt | Ce(triazole thiol)$_3$ 6 grams | 1.125 | 2.5 | 50 | 5 | 0.29 |

TABLE 1-continued

| Example | CRB | Lanthanide salt | GAA (mL) | TPOZ (mL) | Water (mL) | GTMS (mL) | BL-240 (mL) |
|---|---|---|---|---|---|---|---|
| 2 | 15% sol-gel 10 wt % lanthanide salt | Pr(triazole thiol)$_3$ 6 grams | 1.125 | 2.5 | 50 | 5 | 0.29 |

Methods: Corrosion of a panel coated with a sol-gel (a sample) can be monitored using electrochemical methods. A polarization scan is run varying potential through a specified potential range while recording the current response. During the anodic polarization scan when the coating on the panel begins to fail, there is an exponential increase in the recorded current with continued change in potential. The potential at which coating fails resulting in an exponential increase in current is called the breakpoint potential. A more porous coating will fail more quickly (than a less porous coating) and so will reach the breakpoint potential quicker. A more porous coating fails more quickly because there is more ingress of moisture in this coating (than moisture ingress into a less porous coating). A less porous coating will resist the ingress of moisture and will take longer to get to the breakpoint potential.

Tafel analysis, polarization resistance and electrochemical impedance spectroscopy (EIS) data were collected on Gamry 600 potentiostats and equivalent circuit fitting was performed on a Gamry analyst to study the mechanism of corrosion resistance. An open circuit potential (OCP) scan was run on each panel for 1 hour prior to running polarization resistance and Tafel analysis. For Tafel and polarization resistance analysis, which were used for electrochemical analyses herein, the coated metal panel was used as the working electrode, Pt-wire as the auxiliary electrode, saturated calomel electrode (SCE) as the reference electrode, and pH 5 acetate buffer (or 5 wt % NaCl PBS aqueous buffer) was used as the solvent in the cell.

ASTM B117 neutral salt spray (NSS) and ASTM G85 acidified salt spray or $SO_2$ salt spray testing was used for accelerated corrosion testing of the coated panels. Coating weights were calculated by weighing the cleaned panels and reweighing the panels after drying the sol-gel coated panel overnight.

Figure 3:
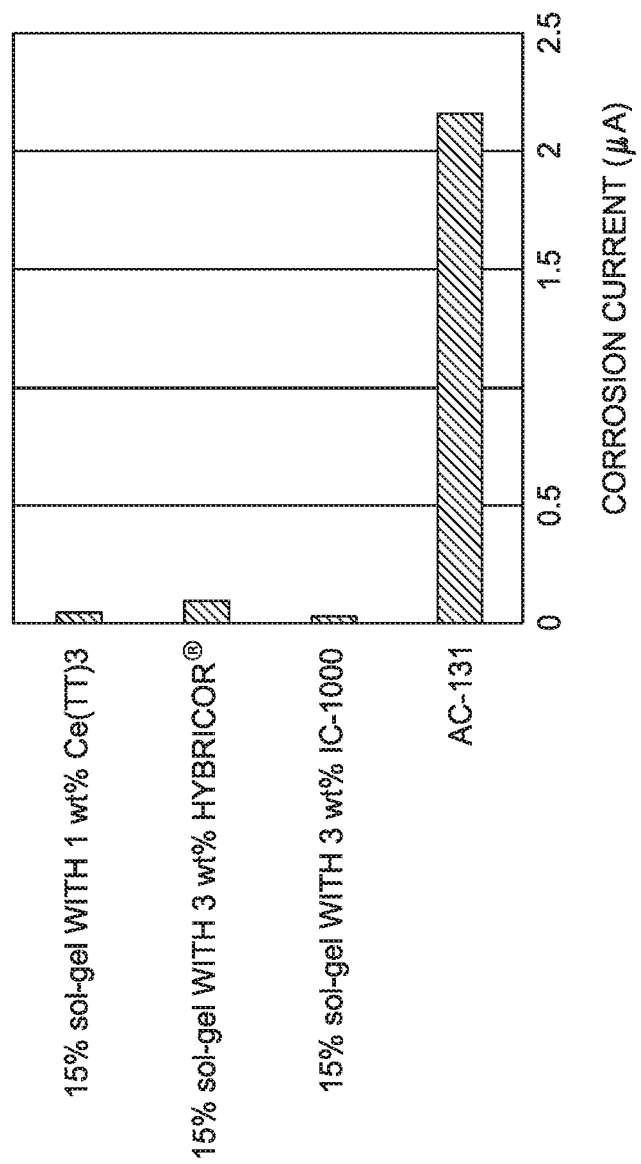
FIG. 3 is a bar graph illustrating corrosion current of a lanthanide salt of the present disclosure and comparative examples.

FIG. 3 is a bar graph illustrating corrosion current of a lanthanide salt of the present disclosure and comparative examples. As shown in FIG. 3, Example 1 sol-gel (15% sol-gel with 1 wt % Ce(triazole thiol)$_3$) provides improved corrosion resistance as compared to an otherwise identical sol-gel having 3 wt % HYBRICOR® or 3 wt % IC-1000 instead of the 1 wt % Ce(triazole thiol)$_3$ of Example 1. IC-1000 ("Inhibicor 1000") is a thiol-based inhibitors available from Wayne Pigment Corporation (WPC) Technologies, Inc., Milwaukee, Wis. HYBRICOR® is an organo-zinc/phosphate/silicate corrosion inhibitor, obtained under the trade designation "HYBRICOR 204" from WPC Technologies, Inc., Milwaukee, Wis.

Figure 4:
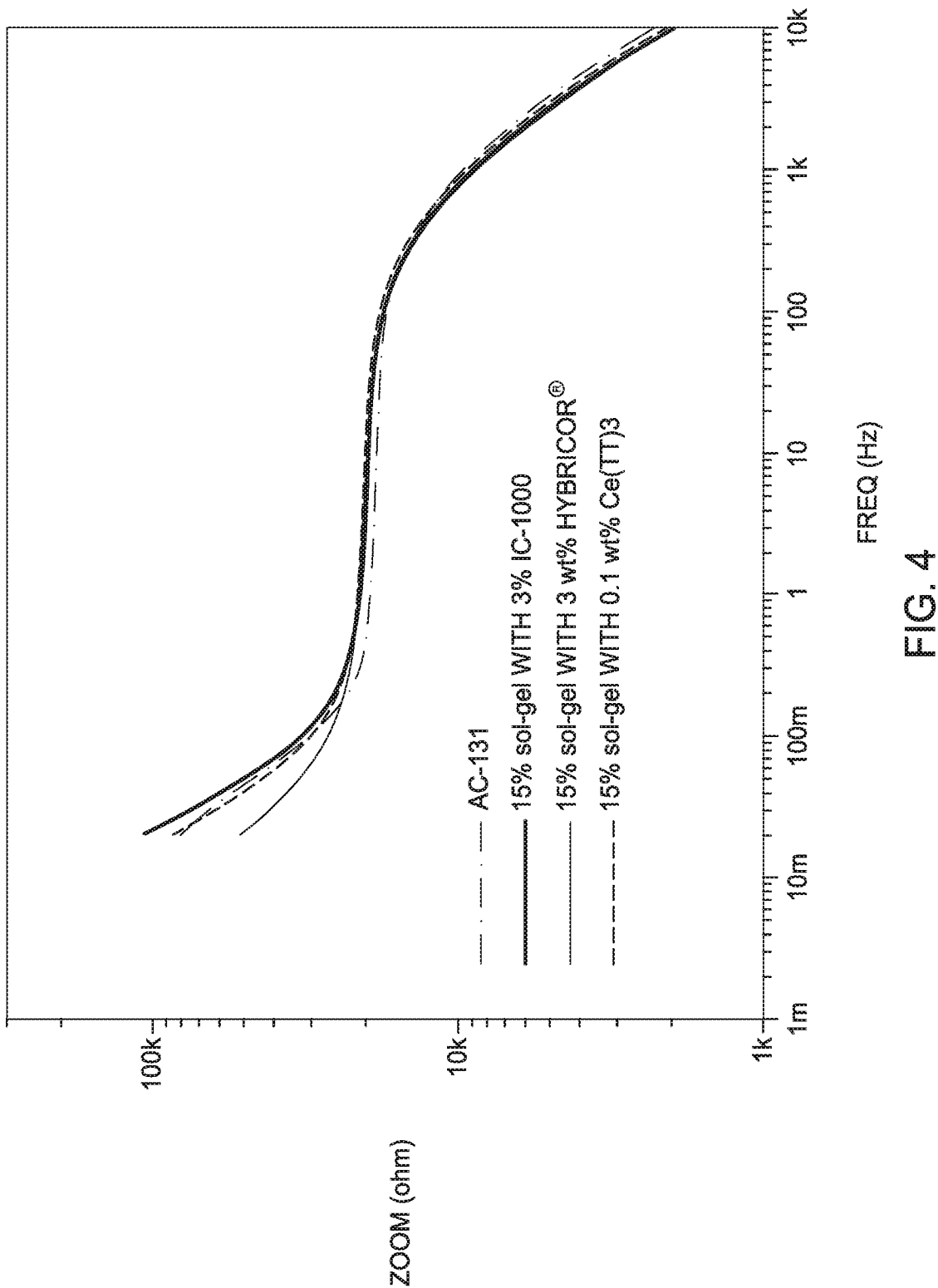
FIG. 4 is a Tafel plot of sol-gel formulated using a lanthanide salt of the present disclosure and comparative examples.

FIG. 4 is a Tafel plot of sol-gel formulated using a lanthanide salt of the present disclosure and comparative examples. As shown in FIG. 4, Example 1 sol-gel (15% sol-gel with 1 wt % Ce(triazole thiol)$_3$) provides improved corrosion resistance as compared to an otherwise identical sol-gel having 3 wt % HYBRICOR® or 3 wt % IC-1000 instead of the 1 wt % Ce(triazole thiol)$_3$ of Example 1. Furthermore, when added to the sol-gel at 3 wt %, HYBRICOR® reacted with the sol-gel matrix causing a decrease in barrier properties.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Definitions

As used herein, "composition", such as a sol-gel, includes a mixture of components and/or the reaction product(s) of the components. Similarly, a sol-gel can be considered a composition.

The term "fused" refers to one or more rings that share at least two common ring atoms with one or more other rings. A heteroaromatic group is an aromatic group or ring containing one or more heteroatoms, such as N, O, S, Se, Si or P. As used herein, "heteroaromatic" is used interchangeably with "heteroaryl", and a heteroaryl group refers to monovalent aromatic groups, bivalent aromatic groups and higher multivalency aromatic groups containing one or more heteroatoms.

The term "optionally substituted" means that a group is either substituted or unsubstituted, at any available position. Substitution can be with one or more groups selected from, e.g., alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyloate, heteroaryloate, alkylcarbonylamino, cycloalkylcarbonylamino, arylcarbonylamino, heterocyclylcarbonylamino, heteroarylcarbonylamino, nitro, hydroxyl, halo, haloalkyl, haloaryl, haloheterocyclyl, haloheteroaryl, haloalkoxy, silylalkyl, alkenylsilylalkyl, alkynylsilylalkyl, and amino. The optional substitution may be one or more groups selected from halo, alkyl, formyl, and amino. The optional substituents may include salts of the groups, for example carboxylate salts. It will be appreciated that other groups not specifically described may also be used.

"Alkyl" whether used alone, or in compound words such as alkoxy, alkylthio, alkylamino, dialkylamino or haloalkyl, represents straight or branched chain hydrocarbons ranging in size from one to about 10 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 10 carbon atoms, or greater.

"Alkenyl" whether used alone, or in compound words such as alkenyloxy or haloalkenyl, represents straight or branched chain hydrocarbons containing at least one carbon-carbon double bond, including, unless explicitly limited to smaller groups, moieties ranging in size from two to about 6 carbon atoms or greater, such as, methylene, ethylene, 1-propenyl, 2-propenyl, and/or butenyl, pentenyl, hexenyl, and higher isomers, including, e.g., those straight or branched chain hydrocarbons ranging in size, for example, from about 6 to about 10 carbon atoms, or greater.

"Alkynyl" whether used alone, or in compound words such as alkynyloxy, represents straight or branched chain hydrocarbons containing at least one carbon-carbon triple bond, including, unless explicitly limited to smaller groups, moieties ranging in size from, e.g., two to about 6 carbon atoms or greater, such as, ethynyl, 1-propynyl, 2-propynyl, and/or butynyl, pentynyl, hexynyl, and higher isomers, including, e.g., those straight or branched chain hydrocarbons ranging in size from, e.g., about 6 to about 10 carbon atoms, or greater.

"Cycloalkyl" represents a mono- or polycarbocyclic ring system of varying sizes, e.g., from about 3 to about 10 carbon atoms, e.g., cyclopropyl, cyclobutyl, cyclopentyl, cyclohexyl or cycloheptyl. The term cycloalkyloxy represents the same groups linked through an oxygen atom such as cyclopentyloxy and cyclohexyloxy. The term cycloalkylthio represents the same groups linked through a sulfur atom such as cyclopentylthio and cyclohexylthio.

"Cycloalkenyl" represents a non-aromatic mono- or polycarbocyclic ring system, e.g., of about 3 to about 10 carbon atoms containing at least one carbon-carbon double bond, e.g., cyclopentenyl, cyclohexenyl or cycloheptenyl. The term "cycloalkenyloxy" represents the same groups linked through an oxygen atom such as cyclopentenyloxy and cyclohexenyloxy. The term "cycloalkenylthio" represents the same groups linked through a sulfur atom such as cyclopentenylthio and cyclohexenylthio.

The terms, "carbocyclic" and "carbocyclyl" represent a ring system wherein the ring atoms are all carbon atoms, e.g., of about 3 to about 10 carbon atoms, and which may be aromatic, non-aromatic, saturated, or unsaturated, and may be substituted and/or carry fused rings. Examples of such groups include benzene, cyclopentyl, cyclohexyl, or fully or partially hydrogenated phenyl, naphthyl and fluorenyl.

"Aryl" whether used alone, or in compound words such as arylalkyl, aryloxy or arylthio, represents: (i) an optionally substituted mono- or polycyclic aromatic carbocyclic moiety, e.g., of about 6 to about 60 carbon atoms, such as phenyl, naphthyl or fluorenyl; or, (ii) an optionally substituted partially saturated polycyclic carbocyclic aromatic ring system wherein an aryl and a cycloalkyl or cycloalkenyl group are fused together to form a cyclic structure such as a tetrahydronaphthyl, indenyl indanyl or fluorene ring.

"Heterocyclyl" or "heterocyclic" whether used alone, or in compound words such as heterocyclyloxy represents: (i) an optionally substituted cycloalkyl or cycloalkenyl group, e.g., of about 3 to about 60 ring members, which may contain one or more heteroatoms such as nitrogen, oxygen, or sulfur (examples include pyrrolidinyl, morpholino, thiomorpholino, or fully or partially hydrogenated thienyl, furyl, pyrrolyl, thiazolyl, oxazolyl, oxazinyl, thiazinyl, pyridyl and azepinyl); (ii) an optionally substituted partially saturated polycyclic ring system in which an aryl (or heteroaryl) ring and a heterocyclic group are fused together to form a cyclic structure (examples include chromanyl, dihydrobenzofuryl and indolinyl); or (iii) an optionally substituted fully or partially saturated polycyclic fused ring system that has one or more bridges (examples include quinuclidinyl and dihydro-1,4-epoxynaphthyl).

"Heteroaryl" or "hetaryl" whether used alone, or in compound words such as heteroaryloxy represents: (i) an optionally substituted mono- or polycyclic aromatic organic moiety, e.g., of about 1 to about 10 ring members in which one or more of the ring members is/are element(s) other than carbon, for example nitrogen, oxygen, sulfur or silicon; the heteroatom(s) interrupting a carbocyclic ring structure and having a sufficient number of delocalized pi electrons to provide aromatic character, provided that the rings do not contain adjacent oxygen and/or sulfur atoms. Typical 6-membered heteroaryl groups are pyrazinyl, pyridazinyl, pyrazolyl, pyridyl and pyrimidinyl. All regioisomers are contemplated, e.g., 2-pyridyl, 3-pyridyl and 4-pyridyl. Typical 5-membered heteroaryl rings are furyl, imidazolyl, oxazolyl, isoxazolyl, isothiazolyl, oxadiazolyl, pyrrolyl, 1,3,4-thiadiazolyl, thiazolyl, thienyl, triazolyl, and silole. All regioisomers are contemplated, e.g., 2-thienyl and 3-thienyl. Bicyclic groups typically are benzo-fused ring systems derived from the heteroaryl groups named above, e.g., benzofuryl, benzimidazolyl, benzthiazolyl, indolyl, indolizinyl, isoquinolyl, quinazolinyl, quinolyl and benzothienyl; or, (ii) an optionally substituted partially saturated polycyclic heteroaryl ring system in which a heteroaryl and a cycloalkyl or cycloalkenyl group are fused together to form a cyclic structure such as a tetrahydroquinolyl or pyrindinyl ring.

"Formyl" represents a —CHO moiety.

"Alkanoyl" represents a —C(=O)-alkyl group. An alkanoyl group may range in size from about $C_2$-$C_{20}$. One example is acyl.

"Aroyl" represents a —C(=O)-aryl group. An aroyl group may range in size from about $C_7$-$C_{20}$. Examples include benzoyl and 1-naphthoyl and 2-naphthoyl.

"Heterocycloyl" represents a —C(=O)-heterocyclyl group. An heterocycloyl may range in size from about $C_4$-$C_{20}$. "Heteroaroyi" represents a —C(=O)-heteroaryl group. A heteroaroyi group may range in size from about $C_6$-$C_{20}$. An example is pyridylcarbonyl.

"Carboxyl" represents a —$CO_2H$ moiety.

"Oxycarbonyl" represents a carboxylic acid ester group —$CO_2R$ which is linked to the rest of the molecule through a carbon atom.

"Alkoxycarbonyl" represents an —$CO_2$-alkyl group. An alkoxycarbonyl group may range in size from about $C_2$-$C_{20}$. Examples include methoxycarbonyl and ethoxycarbonyl.

"Aryloxycarbonyl" represents an —$CO_2$-aryl group. Examples include phenoxycarbonyl and naphthoxycarbonyl.

"Heterocyclyloxycarbonyl" represents a —$CO_2$-heterocyclyl group.

"Heteroaryloxycarbonyl" represents a —$CO_2$-heteroaryl group.

"Aminocarbonyl" represents a carboxylic acid amide group —C(=O)NHR or —C(=O)$NR_2$ which is linked to the rest of the molecule through a carbon atom.

"Alkylaminocarbonyl" represents a —C(=O)NHR or —C(=O)$NR_2$ group in which R is an alkyl group.

"Arylaminocarbonyl" represents a —C(=O)NHR or —C(=O)$NR_2$ group in which R is an aryl group.

"Heterocyclylaminocarbonyl" represents a —C(=O)NHR or —C(=O)NR$_2$ group in which R is a heterocyclic group. NR$_2$ may for example be a heterocyclic ring, which is optionally substituted.

"Heteroarylaminocarbonyl" represents a —C(=O)NHR or —C(=O)NR$_2$ group in which R is a heteroaryl group. NR$_2$ may for example be a heteroaryl ring, which is optionally substituted.

"Cyano" represents a —CN moiety.

"Hydroxyl" represents a —OH moiety.

"Alkoxy" represents an —O-alkyl group. Examples include methoxy, ethoxy, n-propoxy, iso-propoxy, and the different butoxy, pentoxy, hexyloxy and higher isomers.

"Aryloxy" represents an —O-aryl group. Examples include, without limitation, phenoxy and naphthoxy. "Alkenyloxy" represents an —O-alkenyl group. An example is allyloxy.

"Heterocyclyloxy" represents an —O-heterocyclyl group.

"Heteroaryloxy" represents an —O-heteroaryl group. An example is pyridyloxy.

"Alkanoate" represents an —OC(=O)—R group in which R is an alkyl group.

"Aryloate" represents a —OC(=O)—R group in which R is an aryl group.

"Heterocyclyloate" represents an —OC(=O)—R group in which R is a heterocyclic group.

"Heteroaryloate" represents an —OC(=O)—R group in which P is a heteroaryl group.

"Amino" represents an —NH$_2$ moiety.

"Alkylamino" represents an —NHR or —NR$_2$ group in which R is an alkyl group. Examples include, without limitation, methylamino, ethylamino, n-propylamino, iso-propylamino, and the different butylamino, pentylamino, hexylamino and higher isomers.

"Arylamino" represents an —NHR or —NR$_2$ group in which R is an aryl group. An example is phenylamino.

"Heterocyclylamino" represents an —NHR or —NR$_2$ group in which R is a heterocyclic group. NR$_2$ may for example be a heterocyclic ring, which is optionally substituted.

"Heteroarylamino" represents a —NHR or —NR$_2$ group in which R is a heteroaryl group. NR$_2$ may for example be a heteroaryl ring, which is optionally substituted.

"Carbonylamino" represents a carboxylic acid amide group —NHC(=O)R that is linked to the rest of the molecule through a nitrogen atom.

"Alkylcarbonylamino" represents a —NHC(=O)R group in which R is an alkyl group.

"Arylcarbonylamino" represents an —NHC(=O)R group in which R is an aryl group a.

"Heterocyclylcarbonylamino" represents an —NHC(=O)R group in which R is a heterocyclic group. "Heteroarylcarbonylamino" represents an —NHC(=O)R group in which R is a heteroaryl group.

"Nitro" represents a —NO$_2$ moiety.

"Aldehyde" represents a —C(=O)H group.

"Alkylsilyl" represents an alkyl group that is linked to the rest of the molecule through the silicon atom, which may be substituted with up to three independently selected alkyl groups.

"Alkenylsilyl" presents an alkenyl group that is linked to the rest of the molecule through the silicon atom, which may be substituted with up to three independently selected alkenyl groups.

"Alkynylsilyl" presents an alkynyl group that is linked to the rest of the molecule through the silicon atom, which may be substituted with up to three independently selected alkynyl groups.

The term "halo" or "halogen" whether alone or in compound words such as haloalkyl, haloalkoxy or haloalkylsulfonyl, represents fluorine, chlorine, bromine or iodine. Further, when used in compound words such as haloalkyl, haloalkoxy or haloalkylsulfonyl, the alkyl may be partially halogenated or fully substituted with halogen atoms which may be independently the same or different.

Examples of haloalkyl include, without limitation, —CH$_2$CH$_2$F, —CF$_2$CF$_3$ and —CH$_2$CHFCl. Examples of haloalkoxy include, without limitation, —OCHF$_2$, —OCF$_3$, —OCH$_2$CCl$_3$, —OCH$_2$CF$_3$ and —OCH$_2$CH$_2$CF$_3$. Examples of haloalkylsulfonyl include, without limitation, —SO$_2$CF$_3$, —SO$_2$CCl$_3$, —SO$_2$CH$_2$CF$_3$ and —SO$_2$CF$_2$CF$_3$.

The terms "thiol", "thio", "mercapto" or "mercaptan" refer to an organosulphur group containing a sulphurhydryl moiety —SH, which includes a R—SH group where R is a moiety containing a carbon atom for coordination to the —SH moiety, for example an alkylsulphur group. For example, the thiol or mercapto group may be a sulphurhydryl moiety —SH.

The compounds described herein may include salts, solvates, hydrates, isomers, tautomers, racemates, stereoisomers, enantiomers or diastereoisomers of those compounds. For example salts may include sodium, potassium, calcium, phosphates, sulphates, and chlorides. In one embodiment the compounds include salts thereof selected from sodium salts.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

While we have described preferred aspects, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate aspects of the present disclosure and are not intended to limit the scope of the present disclosure.

What is claimed is:

1. A sol-gel comprising:
   about 50 wt % or greater of water;
   about 3 wt % to about 10 wt % of a compound that is a thio-lanthanide (III) salt, wherein the thio-lanthanide (III) salt comprises a triazole thiol ligand and a cation selected from cerium, praseodymium, or yttrium; and
   a binder comprising:
   an organosilane represented by Formula (II):

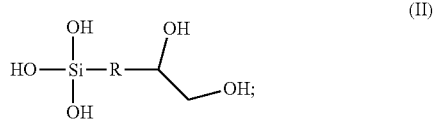

wherein R is selected from the group consisting of alkyl, cycloalkyl, aryl, arylether, poly(ethylene glycol), and poly(propylene glycol);
a zirconium (IV) tetraalkoxide; and
acetic acid;
wherein:
a molar ratio of the acetic acid to the zirconium (IV) tetraalkoxide is from about 1:1 to about 40:1,
a weight fraction of the binder in the sol-gel is about 0.3 wt % to about 50 wt %;
a weight ratio of the thio-lanthanide (III) salt to the binder is from about 0.01:1 to about 5:1; and
the thio-lanthanide (III) salt has a solubility in the sol-gel such that at least 1 g of thio-lanthanide (III) salt is soluble in 1 g of sol-gel.

2. The sol-gel of claim 1, wherein a weight ratio of the thio-lanthanide (III) salt to the binder is about 0.01:1 to about 0.5:1 by weight.

3. The sol-gel of claim 1, wherein a weight ratio of the thio-lanthanide (III) salt to the binder is about 1:1 to about 5:1.

4. The sol-gel of claim 1, wherein the zirconium (IV) tetraalkoxide is selected from the group consisting of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and mixtures thereof.

5. The sol-gel of claim 1, wherein the thio-lanthanide (III) salt is a cerium (III) salt.

6. The sol-gel of claim 1, wherein the thio-lanthanide (III) salt is a praseodymium (III) salt.

7. The sol-gel of claim 1, wherein the sol-gel comprises about 95 wt % or greater of water.

8. The sol-gel of claim 1, wherein the R group is selected from the group consisting of a linear or branched $C_{1-20}$ alkyl chain.

9. The sol-gel of claim 1, wherein the R group is selected from the group consisting of poly(ethylene glycol) or poly(propylene glycol) and has a number average molecular weight of about 300 g/mol to about 500 g/mol.

10. The organosilane of claim 9, wherein the R group is selected from the group consisting of poly(ethylene glycol) or poly(propylene glycol) and has a number average molecular weight of about 400 g/mol to about 425 g/mol.

11. The sol-gel of claim 1, wherein the molar ratio of the acetic acid to the zirconium (IV) tetraoxide is about 4:1 to about 5:1.

12. The sol-gel of claim 1, wherein the weight fraction of the binder in the sol-gel comprises about 8 wt % to about 22 wt %.

13. The sol-gel of claim 1, wherein the thio-lanthanide (III) salt is a metal-organic framework (MOF).

14. The sol-gel of claim 1, wherein:
the molar ratio of the acetic acid to the zirconium (IV) tetraoxide is about 4:1 to about 5:1,
the weight fraction of the binder in the sol-gel comprises about 8 wt % to about 22 wt %, and
wherein the thio-lanthanide (III) salt is a metal-organic framework (MOF).

15. A component comprising:
a metal substrate; and
the sol-gel of claim 1 disposed on the metal substrate.

16. The component of claim 15, further comprising a secondary layer disposed on the sol-gel.

17. The component of claim 16, wherein the secondary layer is an epoxy coating or urethane coating.

18. The component of claim 15, wherein the component is a vehicle component selected from an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and an internal component.

19. The component of claim 15, wherein the metal substrate is selected from aluminum, aluminum alloy, nickel, iron, iron alloy, steel, titanium, titanium alloy, copper, copper alloy, and mixtures thereof.

* * * * *